United States Patent [19]

Klein

[11] Patent Number: 4,473,844

[45] Date of Patent: Sep. 25, 1984

[54] TELEVISION CIRCUIT FOR USE ON SIGNAL RECORDING AND SIGNAL DISPLAY, RESPECTIVELY

[75] Inventor: Johannes Klein, Breda, Netherlands

[73] Assignee: U.S. Philips Corporation, New York, N.Y.

[21] Appl. No.: 296,657

[22] Filed: Aug. 27, 1981

[30] Foreign Application Priority Data

Sep. 17, 1980 [NL] Netherlands ........................ 8005186

[51] Int. Cl.$^3$ ............................................. H04N 5/34
[52] U.S. Cl. .................................................. 358/163
[58] Field of Search ......................................... 358/163

[56] References Cited

U.S. PATENT DOCUMENTS 3,902,011  8/1975  Pieters et al. ........................ 358/163

*Primary Examiner*—Richard Murray
*Attorney, Agent, or Firm*—Thomas A. Briody; William J. Streeter; Edward W. Goodman

[57] ABSTRACT

Television circuit comprising a signal correction circuit which is active on signal recording and display, respectively, to obtain an optimum picture on display, and comprising a memory, memory-location (RC) containing correction information of which correspond to picture subregions (RC), each having their scanning lines (H1–H16), these subregions (RC) having been arranged in a matrix of rows and columns. According to the invention the memory comprises further memory locations (HOC) namely a first, further memory location (HOC1–HOC7) for each column of subregions, absolute correction information being present in each first further memory location for all subregions in the column and relative difference information being present in each memory location (R1C1–R19C7) corresponding to a subregion in the column, each relative difference information per subregion furnishing a correction information for each scanning line in the subregion which information is valid with respect to the preceding scanning line. At a linearity correction of, for example, the horizontal line scan a more or less vertical, shifted, curved information line 4 can be corrected to form a vertical, straight line 3 in the exact position, by means of, for example, an absolute correction from a point $4_1$ to a point $3_1$ and a relative difference correction over sixteen scanning lines H, across the distance difference in the direction of line scan between the points $4_1$ and $4_2$, $4_2$ and $4_3$, etc.

16 Claims, 7 Drawing Figures

TELEVISION CIRCUIT FOR USE ON SIGNAL RECORDING AND SIGNAL DISPLAY, RESPECTIVELY

BACKGROUND OF THE INVENTION

The invention relates to a television circuit for use on signal recording and display, respectively, the circuit comprising a signal correction circuit for obtaining an optimum picture on display, corrections being made in subregions, arranged in columns and rows, of a picture which corresponds with a scene to be recorded and displayed, this picture being converted, on signal recording, as a potential image into a picture signal by means of a line-by-line and field-by-field scan, and being formed, on signal display, by means of the picture signal by means of a line-by-line and field-by-field scan, respectively, the television circuit including a memory whose memory locations, containing correction information, correspond to the subregions which each have their scanning lines, the memory being connected to the signal correction circuit by means of a correction information-carrying output.

Such a circuit for signal recording is described in U.S. Pat. No. 3,902,011, which has for its specific object to correct a shading error. This error occurs when no picture signal of a constant value is obtained when a picture signal source, such as a television camera tube, is uniformly illuminated over a recording surface. The picture has a varying value which depends on the corresponding position in a bidimensional potential image. It is proposed to correct the location-dependent variation of the picture signal by a correction factor which is valid for a predetermined subregion of the potential image. It has further been proposed to perform a refined correction, in that the region correction factors stored as correction information in the memory are not used directly but after interpolation with the factors of adjacent regions.

SUMMARY OF THE INVENTION

It is an object of the invention to provide a refined signal correction not only of the shading error on signal recording, but also of, positioning-dependent errors on recording and display, it being possible to use the correction factors for the regions, stored in the memory directly for the correction without further interpolation.

According to the invention, a television circuit is therefore characterized in that, in addition to the memory locations containing the signal correction information for the subregions of the picture, the memory comprises further memory locations, namely, a first further memory location for each column of subregions, each first further memory location containing absolute correction information for all subregions in the column and relative difference information being present in each memory location corresponding with a subregion in the column, each relative difference information providing for each subregion, a correction information for each scanning line in the subregion which is valid with respect to the preceding scanning line.

The invention is based on the recognition of the fact that the position-dependent correction can be effected in a simple way when the single absolute correction information and furthermore, for each subregion, a predetermined difference information associated with the scanning lines in the subregion, are stored in the memory for each column. The absolute information fixes the starting point of the correction in the column of subregions with respect to which a relative correction is present for each further scanning line having a value and a direction associated with the relevant subregion.

The position-dependent correction to be performed step-wise in the subregions of the columns, may not only be used for the described shading error on signal recording, but may also be used on recording and display for, for example, linearity and displacement errors in the line and field scan and for errors in dynamic focusing of an electron beam scanning a target plate. The correction may also be used for display errors produced during the performance of a dynamic convergence, particularly with color television projection.

In order to obtain an ample correction capability, a television circuit in accordance with the invention is further characterized in that the information is present in the first further memory locations of the memory with a code word having a number of bits which is larger than the number of bits of the code words in the memory locations corresponding with the subregions.

A circuit in accordance with the invention which operates very satisfactorily in practice is further characterized in that the code word in the said first memory locations has eight bits and the code words in the memory locations corresponding with the subregions have five bits, one bit being used for addition and subtraction and four bits for the correction value.

The difference correction between the scanning lines is then only a fraction of the absolute correction, which is satisfactory in practice.

A circuit with, for practical purposes, a very satisfactory choice of the number of scanning lines per subregion, that is to say the number of scanning lines for which one predetermined difference correction occurs as a proper approximation of correction, is characterized in that subregions in a column comprise a number of scanning lines in the order of magnitude of sixteen.

A simple construction of a television circuit in which the correction circuit is provided with shift registers which are connectable to the information output of the memory for periodically storing the correction information, is characterized in that for storing the absolute information, and the relative difference information a first and a second input shift register, respectively, are provided, each having a number of parallel outputs which correspond to the number of bits with which the correction information is provided by the memory, the parallel outputs of the first and the second input shift registers, respectively, being coupled to inputs of a first group of inputs of a first and a second change-over device, respectively, the change-over devices having a second group of inputs and a group of outputs, outputs of the first and of the second change-over devices being connected to a first and a second group, respectively, of inputs of an adder circuit having a group of outputs, the group of outputs of the adder circuit and of the second change-over device, respectively, being connected to a second group of inputs of the first and the second change-over devices, respectively, via a first and a second memory shift register, respectively, while outputs of the first change-over device are coupled to an output of the correction circuit.

A further embodiment is characterized in that, of the group of outputs of the first change-over device, a number of outputs having the most significant bits are connected to the output of the correction circuit via a parallel-in, series-out output shift register and a digital-to-analog converter.

An embodiment in which, for the fixed, single difference corrections in the subregion, the correction differences produced are different for consecutive scanning lines in the subregion because of the action of a threshold, is characterized in that, of the first group of inputs of the first change-over device, a number of inputs having the least significant bits are connected to a terminal which carries a voltage corresponding to logic zero, a number of corresponding outputs of the first change-over device being connected to a number of inputs of the adder circuit which has associated adder inputs which are coupled to outputs of the second memory shift register via the second change-over device.

A circuit in which the recording of the correction information from the memory and the processing in the signal correction circuit is effected in a simple manner, is characterized in that the parallel outputs of the first and the second input shift registers, respectively, are coupled to inputs of the first group of inputs of the first and the second change-over devices, respectively, via a first and a second buffer register, respectively.

A simple recording of the various correction information by the signal correction circuit is achieved in a circuit which is characterized in that the first input shift register is connected to the second input shift register via a by-passing switching device, during each field period, the by-pass not being present during the sequential supply relative difference information and absolute information and being present during the periodic supply of only relative difference information.

A simple embodiment of a television circuit comprising a time signal generator having inputs for receiving a clock pulse signal and a line and field pulse synchronizing signal and having outputs for supplying periodically occurring time signals is characterized in that the time signal generator comprises a resettable clock pulse counting circuit having a series-in, parallel-out shift register which has a clock pulse signal input, a reset input and a data input, the data input being coupled to a register output via a first flip-flop and the reset input, which is connected to a set input of the first flip-flop, being connected to an output of a second flip-flop for supplying a set-reset signal of line frequency when the line pulse synchronizing signal is applied to a clock input and an internal signal of line frequency is applied to a reset input of the flip-flop, which internal signal of the line frequency is produced by logic circuits from output signals of the series-in, parallel-out shift register.

A further, simple embodiment in which the number of lines of the subregions are fixed, is characterized in that the time signal generator comprises a resettable, periodic, binary line counting circuit having a clock input for receiving the internal signal of the line frequency and having a reset input which is connected to an output of a third flip-flop having a preparatory input for receiving the field pulse synchronizing signal and a clock input for receiving the line pulse synchronizing signal, the third flip-flop output having for its function a reset signal which has a duration of several line periods and which exceeds the field synchronizing pulse.

An embodiment of the circuit in which the time signal generator is switched-off for the generation of signals having a frequency which is higher thant the line frequency, for several line periods at the beginning of each field period, is characterized in that the time signal generator comprises a logic gate an input of which is connected to an output of the first flip-flop for supplying, with blocking polarity, a signal which corresponds to the signal of a duration of several line periods, the gate output of the logic gate being connected to the clock input of the second flip-flop, this logic gate having a further input for receiving the line pulse synchronizing signal.

An embodiment of the circuit with which some pulse signals are generated at the beginning of the field period is characterized in that the time signal generator comprises a resettable, decade, line pulse counting circuit which has a clock input for receiving the line pulse synchronizing signal, a reset input for receiving the field pulse synchronizing signals with an enabling polarity for the field synchronizing pulse of the duration of several line periods, and a plurality of outputs, a first output being connected to a clock input of a fourth flip-flop via an inverter and a further output being connected to a reset input of the flip-flop.

A simple embodiment of a television circuit comprising a memory in which information about several different signal corrections have been stored, is characterized in that the circuit comprises several signal correction circuits which are arranged in series and connected to the information output of the memory, the last signal correction circuit in the series arrangement applying an enabling signal to an enable connection line to the memory after full reception of the correction information.

When a plurality of signal correction circuits and the described time signal generator are used, a television circuit provided with a simple memory clearance is characterized in that in each of the signal correction circuits, the outputs of the binary line pulse counting circuit and an output of the fourth flip-flop are connected via an OR-gate to an input of and AND-gate which has a further input and an output, which are connected to an incoming and an outgoing enable connection line, respectively.

DESCRIPTION OF THE DRAWINGS

The invention will now be further explained by way of non-limitative example with reference to the accompanying drawings, of which.

DESCRIPTION OF THE PREFERRED EMBODIMENT

Figure 1:
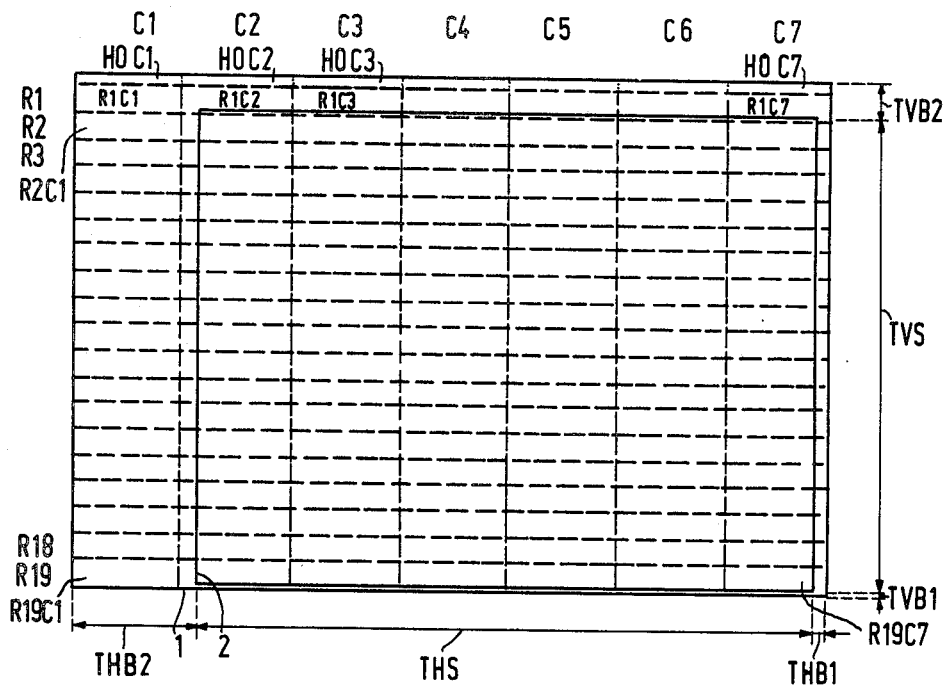
FIG. 1 shows an area having regions and sub-regions which are subjected, or not subjected, to a line-by-line and field-by field scan and represent memory locations in a memory, respectively.

Referring to FIG. 1, reference numerals 1 and 2 denote two regions in an area. For the regions 1 and 2, some time intervals in the horizontal direction are denoted by THB2, THS, THB1 and in the vertical direction by TVB2, TVS and TVB1. These intervals correspond to periods of time which are standardized for television, THS represents the line scanning period, THB1 the front porch and THB2 the line synchronizing pulse period and the back porch, THB1+THB2=THB representing the line blanking period. Herein, a line period TH has a duration equal to the sum of the periods of time THS, THB1 and THB2. In a similar, standardized way, TVS denotes the field scanning period, TVB1 the pre-equalizing period and TVB2 the remaining period of time of the field blanking period TVB, a field period TV having a duration equal to the sum of the time durations TVS, TVB1 and TVB2. In this way, the region 2 corresponds to an area which is scanned line and field sequentially. For a television recording, the scanned region 2 is found in a recording, the region 2, when the recording device is in the form of a pick-up tube, being present on a target plate on which a potential image, corresponding to a scene to be recorded, is formed which is converted by means of a scanning electron beam into a picture signal which represents the scene and which becomes available at an output of the pick-up tube. On display, the scanned region 2 is present on the display screen of a display tube, the picture signal to be displayed modulating the current intensity of an electron beam generated in the tube, this electron beam scanning a display screen layer which emits lights in dependence on the current intensity. In addition, with respect to the scanned region 2, the region 1 shows the time interval in which the standardized line and field blanking is active.

Broken lines in the region 1 define subregions which are arranged in nineteen rows R1, R2, R3 ... R18, R19 and seven columns C1, C2, C3, C4, C5, C6 and C7. The subregions in the rows and columns are defined by R1C1, R1C7, R19C1 and R19C7, depending on their position. The subregions R1C1 ... R19C7 correspond to memory locations in a memory, which will be described hereafter. These memory locations store correction information which is used, in the example given, for television recording, to obtain an optimum picture signal by means of a position-dependent correction. It will be found that the information for a correction of the picture signal to be performed in, for example, the subregion R1C3 is stored in the memory in a memory location which corresponds to the preceding subregion R1C2, or, put differently: the correction-information stored in the memory location (R1C2) is processed in the associated portion of the line periods TH in the subregion, whereafter the correction information is utilized during the portion of the line periods TH belonging to the next subregion (R1C3). In this manner the correction for the subregion R1C1 is stored in the memory location R1C7.

In FIG. 1 references H0C1, H0C2, H0C3, ... H0C7 denote (by means of dotted lines) the memory locations which contain information which is not associated with a specific subregion R1C1 ... R19C7. In accordance with the invention, the memory locations H0C1, H0C2, H0C3, ... H0C7 are present and each of them contains, being the first memory locations of the columns C1, C2, C3, ... C7, an absolute correction information for all the subregions RC in the relevant column, while relative difference information is present in each memory location R1C1 ... R19C7 corresponding with a subregion RC, each relative difference information producing, for each subregion RC, a correction information for each scanning line in the subregion RC which is valid with respect to the preceding scanning line.

Figure 2:
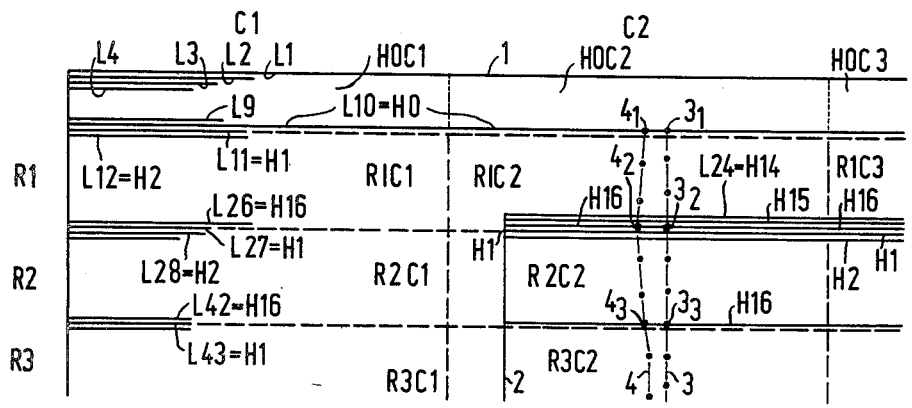
FIG. 2 shows a portion of the area of FIG. 1 on an enlarged scale.

For clarity, the left-hand upper portion of the area of FIG. 1 is shown on an enlarged scale in FIG. 2, L denoting lines which may occur as actual scanning lines in the region 2 in accordance with a television standard, and which may be blanked outside this region. It is shown that ten blanked scanning lines L1, L2, L3, L4 . . . L9, L10=H0 occur outside the subregions RC. Let it be assumed that the line L1 has its starting moment near the beginning of the field synchronizing pulses in a standardized television synchronizing signal, these pulses being produced after the pre-equalizing pulses. FIG. 2 shows that the next, partially or fuly blanked scanning lines L11 ... L26 start in the subregion R1C1. The line L11 is further denoted by H1, the following lines L12 ... L26 being further denoted by H2 ... H16. The partially blanked scanning lines L27 ... L42, which are denoted in the subregion by H1 ... H16, start in the subregion R2C1. It can be seen that there are sixteen scanning lines in the rows R1, R2, R3 and the further rows R of subregions. For a 625-line system with interlace and, consequently, 312.5 lines per field period TV, which system is here used as an example, the line raster is of the following implementation for FIG. 1 and FIG. 2: 10 lines outside the subregions RC, followed by 18 rows R1, R2 ... R18, each having 16 lines, whereafter the row R19 of subregions has 14.5 lines, which results in a 312.5 line raster. In a similar manner, it follows for an interlaced 525-line system having 262.5 lines per field period TV, that after the 10 lines there follow for the subregions RC 15 rows R1, R2, ... R15 having 16 lines and one row R16 having 12.5 lines.

Starting from a standardized field blanking period TVB equal to 25 line periods in the 625-line system, it follows that after the pre-equalizing period TVB1, which has a duration of 2.5 line periods, there is produced the first non-blanked line after 22.5 line periods, which defines the center of the line L23. So, the standardized line scan begins in the subregion R1C2 from the line L24=H14. For the 525-lines system it follows, for a field blanking period TVB equal to 20 line periods and a pre-equalizing period TVB1 of 3 line periods, that the standard line scan begins after 17 line periods, with line L18=H8. On recording and display, the line and field blanking is in practice not exactly equal to the line and field blanking prescribed in the standard. Generally, shorter blanking periods will be chosen for television recordings than prescribed by the standard and on display they will in practice be longer.

Reference numeral 3 in FIG. 2 is a vertical, straight dot-and-dash line and reference numeral 4 is a more or less vertical, curved dot-and dash line. Line 3 represents an imaginary, vertical straight information line which may, for example, occur on a test chart which is recorded by a television camera. Owing to optical errors and shifts and non-linearities in the horizontal line scan on recording, a vertical straight information line may result in the curve 4 for an ideal display of the resulting picture signal. In this example the correction to be performed has for its purpose to adapt the horizontal line scan on recording, so that recorded vertical information lines are indeed produced on display as vertical information lines in the proper locations, and not as curved or oblique information lines. Let it be assumed that at a non-corrected horizontal line scan, the imaginary information line 3 on recording will result in the imaginary information line 4 at an optimum display. Reference numerals $3_1$, $3_2$ and $3_3$ represent points on the information line 3 where this line is intersected by the respective scanning lines $L10=H0$, $L26=H16$ and $L42=H16$, which further intersect the information line 4 at $4_1$, $4_2$ and $4_3$. Performing the correction of the line scan is achieved by, for example, shifting the point $4_1$ to the point $3_1$ during the scanning line $L10=H10$ and by thereafter bridging, in the course of 16 scanning lines (H1 ... H16), in a number of steps, the difference between the points $4_1$ and $4_2$ into the direction of line scan, so that the point $4_2$ coincides with the point $3_2$. Thereafter, the difference between the points $4_2$ and $4_3$ is bridged into the direction of line scan in a number of steps so that the point $4_3$ coincides with the point $3_3$. When this shift from the point $4_1$ to point $3_1$ is opted for, it follows that in the subregions R1C2 and R2C2, the polarity or direction of the correction is into the opposite direction, as the point $4_2$, which was shifted over the distance $4_1$ to $3_1$ is located before the point $3_2$ and the shifted point $4_3$ is behind the point $3_3$. A shift into the direction of line scan and into the opposite direction, respectively, accomplishes the correction. If, on the contrary, at the occurrence of the blanked scanning line $L10=H0$ the point $4_1$ would have been shifted over the distance $4_2$ to $3_2$, then the two points $4_1$ and $4_3$ would occupy a position behind the points $3_1$ and $3_3$, respectively, while the point $4_2$ is shifted to the point $3_2$. The correction of the subregion R1C2 in which the scanning lines H have been blanked for the major part may be omitted, while the correction for the subregion R2C2 remains the same. Independent of the chosen magnitude of the correction at the occurrence of the scanning line $L10=H0$ at the points $4_1$ and $3_1$, it is assumed that an absolute correction information is present in the memory (in memory location H0C1) and that for the scanning lines H1 through H16 in the subregion R1C2, a relative difference information is present in the memory (in memory location R1C1). This difference information is used 16 times for the subregion R1C2 so that at, for example, the scanning line H14 in the subregion R1C2, the total correction consists of the absolute correction plus 14 times the relative difference correction. For the corresponding scanning line H14 in the subregion R2C2 there follows by way of total correction, the absolute correction plus 16 times the relative difference correction associated with the subregion R1C2 and 14 times the relative difference correction associated with the subregion R2C2 (present in the memory location R2C1).

It can be seen that the correction information stored in the memory location H0C1 results in an absolute correction for all subregions R1C2, R2C2, R3C2 etc. in the column C2 of subregions RC, while the memory locations R1C1, R2C1, R3C1 etc. furnish the relative difference information for the subregions R1C2, R2C2, R3C2, this difference information being used 16 times in an adding or subtracting operation.

It is described that the correction information in the memory locations H0C1 through H0C6 and R1C1 ... R1C6, R2C1 ... R2C6 through R19C1 ... R19C6 may be used in the subregions RC of the columns C2 through C7 for the local correction of the line scan. The information for a different correction may be stored in the memory locations H0C7, R1C7 through R19C7 of the column C7 a shift of the entire scanning lines H0, H1 through H16 is mentioned by way of example. Also for this entire line shift, an absolute correction information is stored in the memory location H0C7 and the relative difference information is stored in the memory locations R1C7 through R19C7 of the column C7. This correction information becomes available in the portion THB2 of the line blanking periods THB and the starting points of the scanning lines L in the region 2 can be adjusted to a straight vertical line with this correction information.

For the implementation of a memory suitable for performing a shift or linearity correction at the line scan in accordance with the method described for FIG. 1 and FIG. 2, it follows that 7 memory locations are required for the absolute correction information and $7\times19=133$ memory locations are required for the relative difference information. When 16 scanning lines H1 through H16 are chosen for each row R1, R2 etc of subregions RC, which proved to be a very satisfactory choice in practice, it has further been found that a code word of 8 bits for the absolute value and of 5 bits, wherein 1 bit is used as a sign bit and 4 bits for the differential value, is very satisfactory in practice. Then, before the (blanked) line H0 is scanned, the memory releases a composite code word consisting of $7\times8=56$ bits for the absolute correction and $7\times5=35$ bits for the relative correction. Before the lines H16 are scanned, the memory periodically supplies the code word with $7\times5=35$ bits for the relative correction. The choice of 8 bits for the absolute correction and 4 bits for differential value correction per subregion RC, which is repeated 16 times, is a practical choice, which is very satisfactory for the correction of the line scan. In general, the sole requirement is that the range of the absolute correction must exceed the range of the differential correction over the subregion, which means that the information in the first memory locations H0C1 through H0C7 must be present in the form of a code word having a number of bits which is larger than the number of bits of the code words in the memory locations R1C1 through R19C7 which correspond with the subregions.

The correction information, which must be stored in the memory of the television circuit of the invention in the form of code words, may be accomplished in a manner known by those skilled in the art. Use may then be made of a circuit with which, on the one hand, the information in each memory location can be set at one's option and on the other hand, a target area (cursor) is indicated on a display screen to which the memory location corresponds. The cursor can be shifted at will and when it has been superimposed on a subregion, the information in the associated memory location can be adjusted, during the recording of a test pattern with vertical information lines, so that the vertical line or lines in the subregion become located in the proper position. The corrections for subregions can be adjusted sequentially by means of the circuit generating the cursor and the code words are stored in the associated memory locations. For the adjustment of corrections associated with the blanked subregions RC in the column C1 and with the blanked scanning line $L10=H0$, it should be noted that the influence of the corrections is noticeable in the observable region 2. For a change in correction at the blanked scanning line $L10=H0$ in the portions H0C2 through H0C7, it follows that a vertical information line in one of the columns C2 through C7 is shifted in its totality into the horizontal direction of line scan. A change in the correction at the line portion H0C1 of the blanked scanning line $L10=H0$, shifts in its totality the line at which the starting points of the scanning lines L24 etc. in the region 2 start, this starting point line being formed into a straight, vertical line by the changes in correction in the blanked subregions R1C1 through R19C1 in the column C1. An associated cursor in the observable region 2 may be utilized when these corrections are adjusted, which cursor can then be provided with an additional, observable information, for example with the address code in the memory.

Starting from the test pattern with vertical information lines in the observable region 2 the correction adjustment can be done as follows:

A. The shift correction for the more or less vertical line of starting points of the scanning lines L24 etc. of the region 2 is introduced by, one after the other, the line portion H0C1 of the scanning line L10=H0 and the subregions R1C1 through R19C1 of the column C1, until a vertical, straight starting-point line has been obtained.

B. For one or more, more or less vertical test pattern lines in the column C2, a shift correction is first introduced at the line portion H0C2, which is the same for the entire single line or all the several test pattern lines, a correction being introduced for, one after the other, subregions R1C2 through R19C2 in the column C2 to make the single or several test pattern lines vertical and straight.

C. The influences on the degree to which the starting-point line of the region 2 adjusted according to subparagraph A is vertical and straight, which influence is the result of the subregion adjustment according to subparagraph B, is corrected in the manner described in subparagraph A, while the influence resulting therefrom on the one or several test pattern lines in the column C2 is corrected in the manner described in subparagraph B. This alternately introduced correction is repeated until an optimum correction of the starting-point line for the region 2 and the one or several test pattern lines in the column C2 has been accomplished.

D. In the manner described in subparagraph B, the one or several test pattern lines in the columns C2 through C7 are shifted, made straight and vertical, one after the other, whereafter the memory has been completely filled with the position-dependent correction information.

It should be noted that the shift then introduced in the columns C2 through C7, in the direction of line scan and into the opposite direction, must result in a total shift of approximately zero for each of the scanning lines L of the same length. The length of the scanning lines L is then not substantially influenced.

Instead of the above-described manner of filling the memory, thoughts might go to an automatic filling procedure. Herein the output signal of a camera recording a test pattern may be compared in a comparison circuit with a test signal obtained from a test pattern generator, the differential signal obtained from the comparison circuit determining the correction information to be stored in the memory.

The description of FIG. 2 is based on a linearity correction and a shift correction for the horizontal line scan on signal recording. A test pattern is mentioned having vertical information lines and being recorded by a television camera. The correction mentioned described above may alternatively be performed in a television display apparatus, the test pattern having vertical information lines being, for example, generated by a test pattern generator.

A linearity and shift correction may further be used, on recording and display for the vertical field scan, use being made of a test pattern having horizontal information lines. By influencing the field scan with the line frequency, the horizontal information lines can be shifted in their totality upwards or downwards, while influencing the field scan with a higher frequency of seven times the line frequency accomplishes the local corrections, which result in that the horizontal information lines become straight.

When, for example, a test pattern having horizontal and vertical information lines is used, a correction may be adjusted at a dynamic focusing on recording and on display, while a convergence correction may be adjusted on display.

Figure 3:
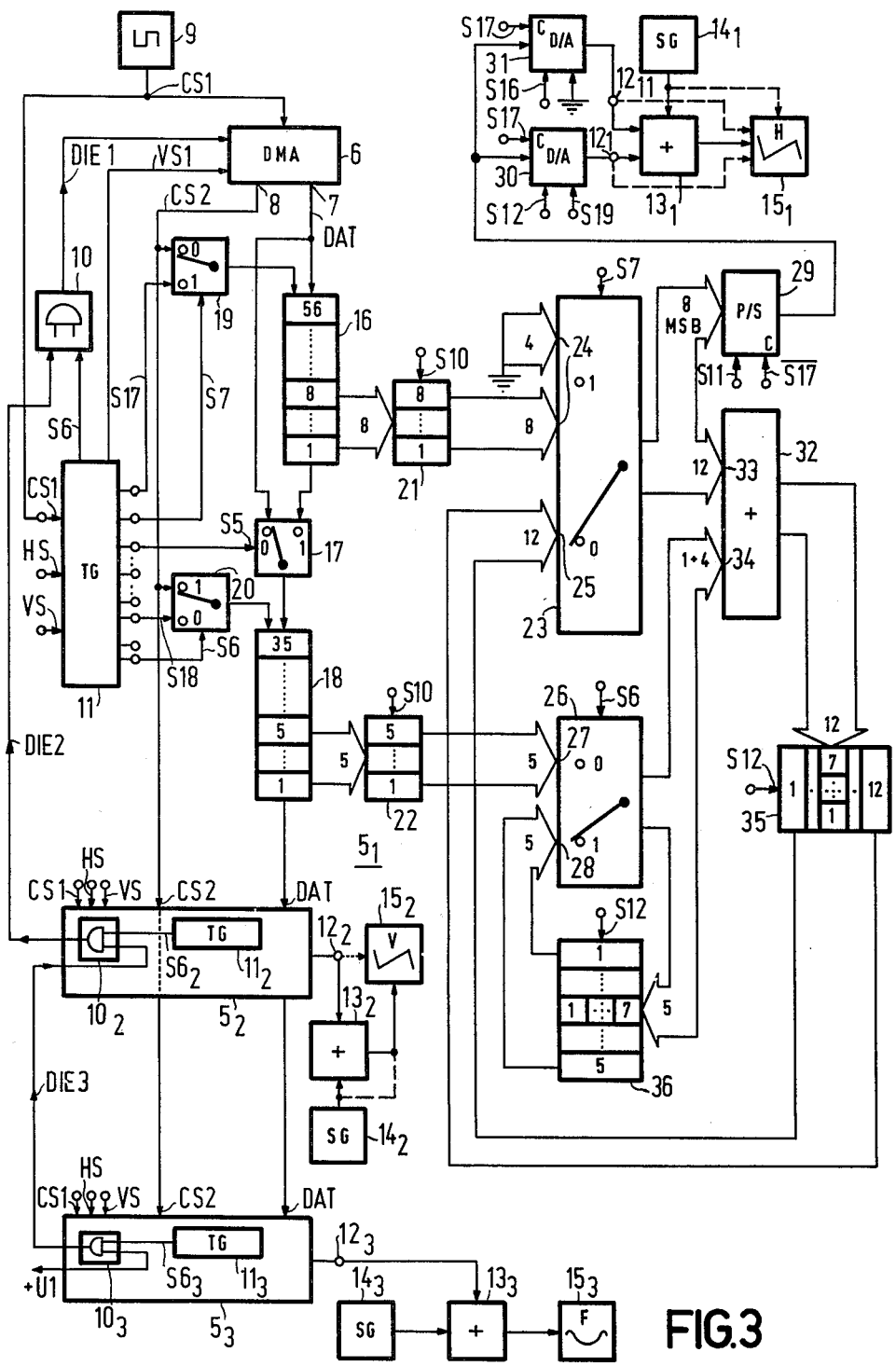
FIG. 3 is a block-schematic circuit diagram of a television circuit of the invention, comprising a plurality of signal correction circuits.
Figure 4:
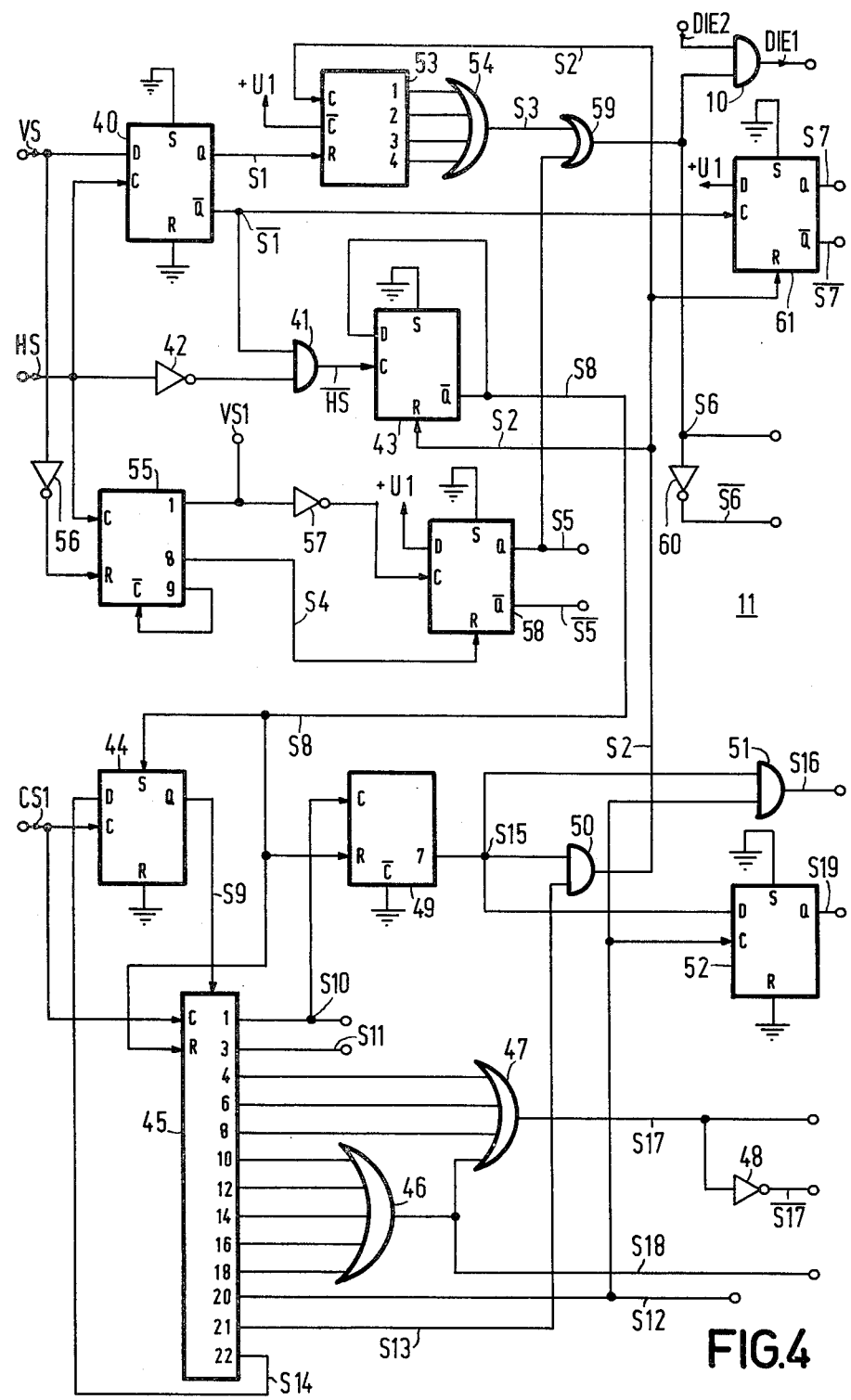
FIG. 4 is a detailed representation of an embodiment of a time signal generator suitable for use in the circuit of FIG. 3, FIGS. 5 and 6 show signal variations of a number of signals as a function of the time.
Figure 5:
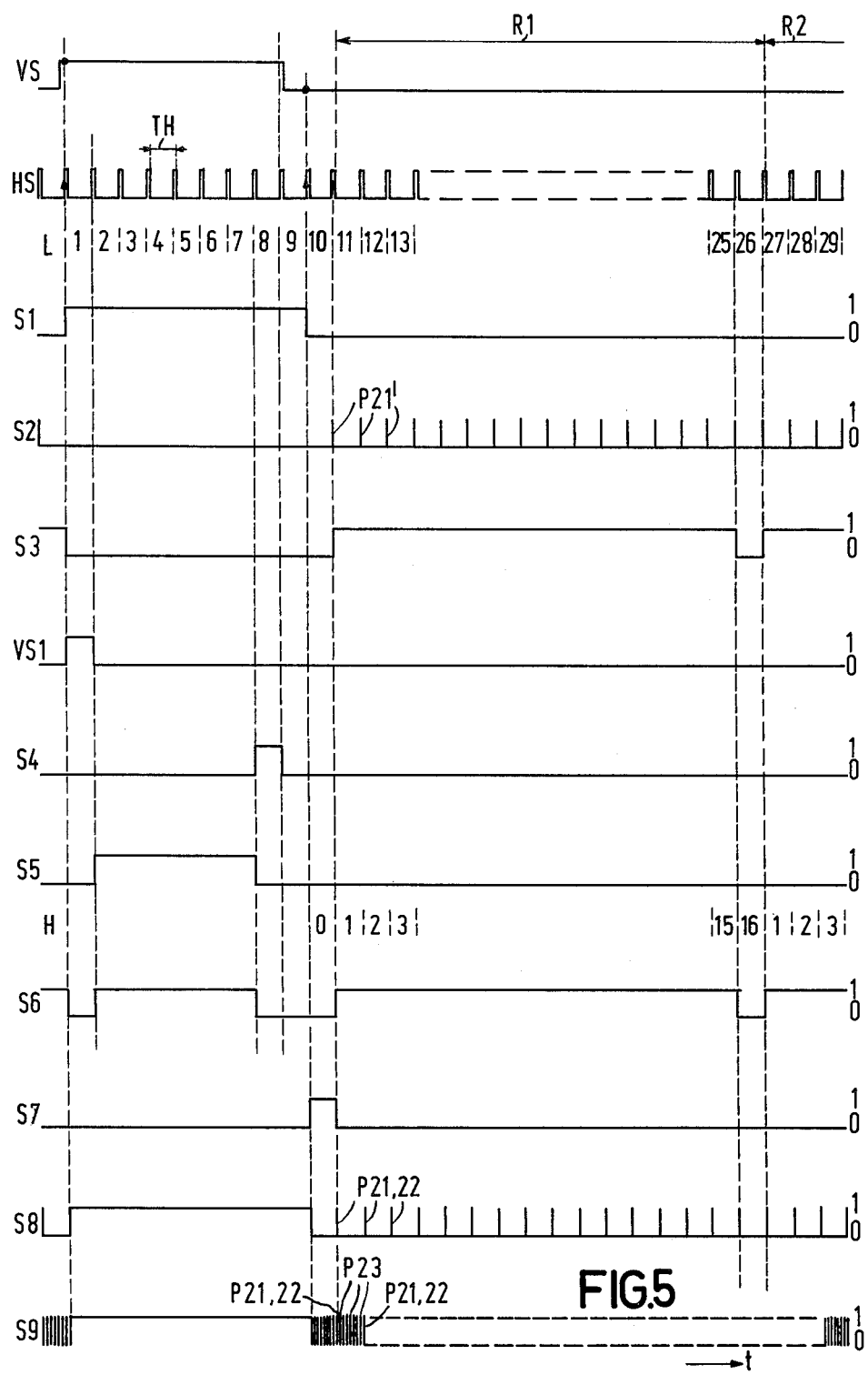
Figure 6:
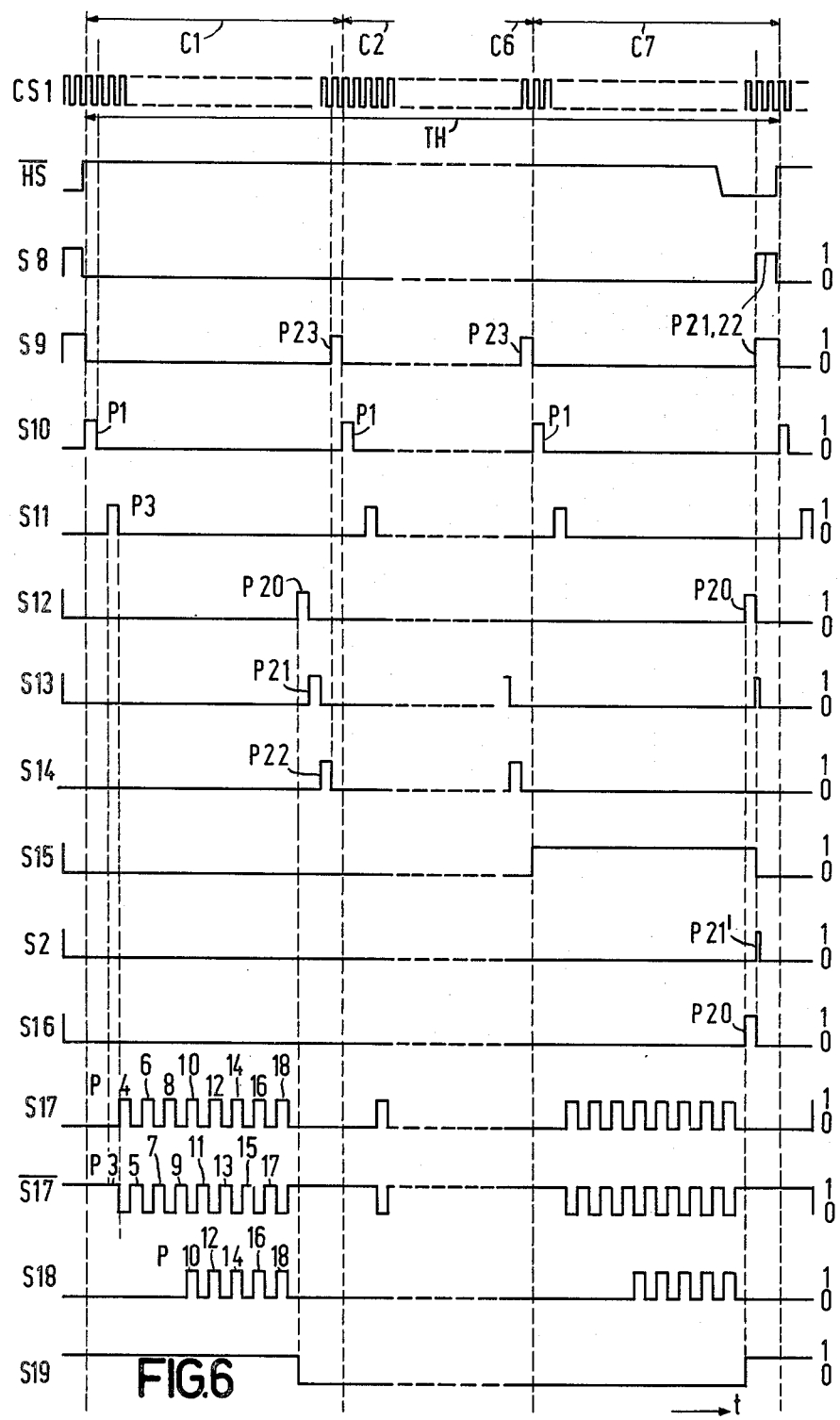

FIG. 3 shows a block schematic circuit diagram of a television circuit in accordance with the invention, having three signal correction circuits $5_1$, $5_2$ and $5_3$ and a memory 6, which has a direct memory access DMA. The circuits 5 are arranged in series and are connected to an information output 7 of the memory 6, a clock pulse output 8 of which is further connected to the circuits 5. A clock pulse signal CS2 is produced at the output 8 when an information DAT becomes available at the output 7. The memory 6 has an input which is connected to an output of a clock pulse source 9, this output carrying a clock pulse signal CS1. Further memory inputs are connected to an output of a coincidence gate 10, on which output a signal DIE1 with an enable value may be present, and to an output of a time signal generator 11 (TC), which output carries a signal VS1. FIG. 4 shows the time signal generator 11 in detail. FIG. 5 and FIG. 6 show signal variations, as a function of the time t, of signals occurring in the circuits shown in FIG. 3 and FIG. 4. In FIG. 5 and FIG. 6, the signals produced by the time signal generator 11 are denoted by S1, S2 through S19 and VS1, which signals occur with a logic 0 or 1 value. The generator 11 produces the periodically occurring signals shown in the drawing when the clock pulse signal CS1, a line pulse synchronizing signal HS and a field pulse synchronizing signal VS are applied to it.

FIG. 5 shows the signals VS and HS, TH denoting a line period and L1, 2, 3, ... 29 representing some scanning lines L1, L2, L3 etc. which were described with reference to FIG. 2. The signal VS is shown with one field synchronizing pulse having a duration of, for example, approximately 8.5 line periods TH. This is accompanied by a scanning line L10, which is further denoted by H0 in FIG. 5, so that it holds in the manner described for FIG. 2 that: L10=H0. It likewise follows that L11=H1 through L26=H16, R1 in FIG. 5 indicating the duration in which 16 scanning lines L occur in the row R1 of subregions RC in the manner described for FIG. 2. The scanning line L27=H1 marks the beginning of a next period of time R2 with 16 scanning lines L.

FIG. 6 shows the clock pulse signal $CS_1$ and the inverted line pulse synchronizing signal HS, covering just more than the duration of one line period TH. References C1, C2 ... C6, C7 denote periods of time along a time scale which is interrupted between the periods C2 and C6. The periods of time C1 through C7 in FIG. 6 correspond to the scan described for FIG. 1 and FIG. 2 of the fully or partially blanked scanning lines L in the columns C1 through C7 of subregions RC. Pulses which have been derived from the clock pulse signal CS1 and are denoted by p1, p3 through p23, these pulses p having a duration equal to one clock pulse period, are shown as the signals produced by the time signal generator 11, reference p21, 22 denoting pulses having a duration of two clock periods in the signals S8 and S9 of FIG. 5 and FIG. 6, and a very short pulse at the beginning of a clock pulse period is denoted p21' in the signal S2 of FIG. 5 and FIG. 6. From FIG. 6 it can be seen that in the line period TH, 6×23 pulses p are produced during the six time periods C1 through C6 and 22 pulses p during the time period C7 so that a total of 160 pulses p are provided in each line period TH. In the 625-line system with a line frequency equal to 15,625 Hz, the clock pulses occur with a clock pulse frequency equal to 2.5 MHz. In the 525-line system with a line frequency of 15,750 Hz the clock pulse frequency is 2.52 MHz.

It should be noted that the signals shown in FIG. 6 are related to the accurately fixed, positive-going pulse edge in the inverted line pulse synchronizing signal HS, while the signal shown in FIG. 5 which has pulses at the beginning of a field period, are determined by the non-accurately fixed, positive-going pulse edge in the signal HS. As a result thereof, the scanning lines L shown in FIG. 5 are shifted over a very short time with respect to the line period TH, which is accurately indicated in FIG. 6.

Figure 7:
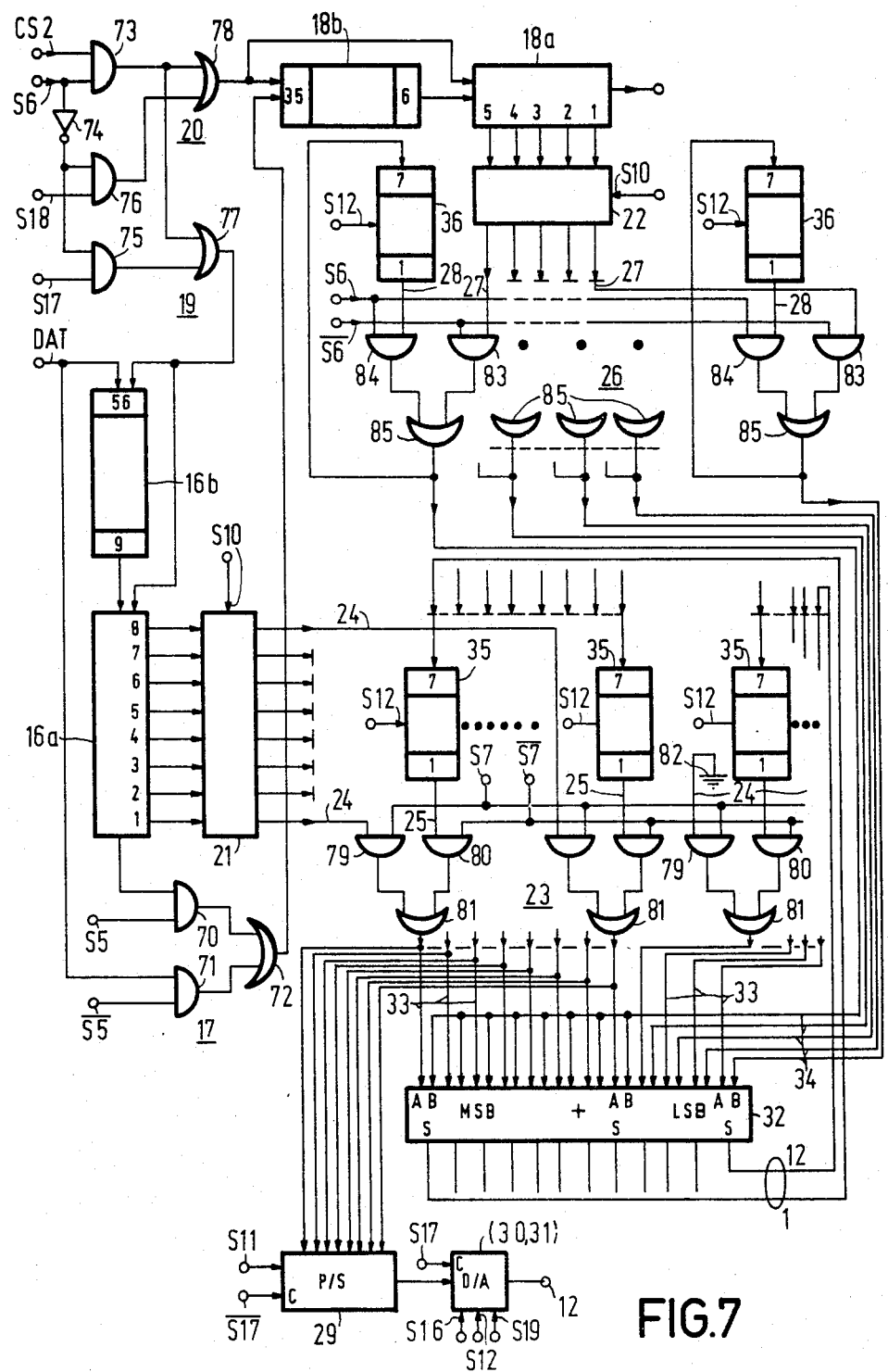
FIG. 7 shows a detailed embodiment of a further portion of the circuit of FIG. 3.

FIG. 3 shows the correction circuit $5_1$ in greater detail than the circuits $5_2$ and $5_3$, further details thereof being shown in FIG. 7. Each circuit 5 may be of a specific construction and may be adapted to the signal correction to be accomplished. This adaptation applies, for example, to the length of code words, but does not imply essential differences. With an identical construction, code word matching, that is to say of the number of bits, can be accomplished by introducing logic 0 at the most significant bits. In FIG. 3, the circuits $5_1$, $5_2$ and $5_3$ are provided with respective output terminals $12_1$, $12_2$ and $12_3$, which carry correction signals and which apply these correction signals to adder stage $13_1$, $13_2$ and $13_3$, respectively. The adder stages $13_1$, $13_2$ and $13_3$, respectively, are connected to the output of signal generators $14_1$, $14_2$ and $14_3$, respectively, by means of further inputs the adder stages outputs being connected to signal processing circuits $15_1$, $15_2$ and $15_3$, respectively. In the example given, the circuit $15_1$ provides the horizontal line scan, which is shown by means of a sawtooth-shaped signal and a reference H. The circuit $15_2$ may, for example, provide the vertical (V) field scan, while the circuit $15_3$ may provide a dynamic focusing (F) by means of a parabolic signal. In the case of a direct signal and correction signal supply to a processing circuit 15, the adder stage 13 may be omitted, as indicated by means of broken lines at $13_1$ and $13_2$. FIG. 3 shows that the circuit $5_1$ has a second output terminal $12_{11}$, which is connectable to the adder stage $13_1$ or to the signal processing circuit $15_1$. As the signal correction circuits $5_1$, $5_2$ and $5_3$ are all of an identical construction, only circuit $5_1$ will be described in detail.

In view of the fact that the circuits $5_1$, $5_2$ and $5_3$ are connected in series-arrangement to the information output 7 of the memory 6, coincidence gates $10_2$ and $10_3$ and time signal generators $11_2$ and $11_3$ are included in the circuits $5_2$ and $5_3$. This connection as a series arrangement has the advantage that one single information output 7 is connected to one single DAT-information line, it being possible to report a detection of the reception of a full information in the last signal correction circuit ($5_3$) back to the memory 6 in a simple way via the series arrangement. In the case of a full DAT-information reception in the circuit $5_3$, which is accompanied by a full reception in the preceding circuits $5_2$ and $5_1$, the time signal generator $11_3$ applies, in a signal $S6_3$, a logic 1 to an input of the coincidence gate $10_3$, which is in the form of an AND-gate and which is connected by means of a further input to a positive voltage $+U1$, which corresponds to a logic 1. In response thereto, the gate $10_3$ applies the logic 1 as an enable value in an enable signal DIE3 to an output of the circuit $5_3$, which is connected to an input of the gate $10_2$ in the circuit $5_2$. The gate $10_2$, to which also a signal $S6_2$ is applied, produces in response thereto the logic 1 in an enable signal DIE2, which is applied to an input of the gate 10 in the circuit $5_1$. At a further input the gate 10 receives the signal S6, shown in FIG. 5, from the time signal generator 11. This provides a reporting back to the memory 6 via enable connecting lines DIE1, 2 and 3. It can be seen that the memory 6 is not released during scanning of the scanning lines L1, L8, L9, L10=HO and the periodically occurring scanning lines H16. Outside the time periods corresponding therewith, the store 6 is enabled to release the DAT-information. The memory 6 then supplies periodically the relative differential information for the subregions RC before the scanning lines H16 occur, while the application of the pulse to the memory 6 during the scanning line L1 in the signal VS1 of FIG. 5, triggers the memory 6 to sequentially release relative differential information and the absolute correction information for the duration of the scanning lines L2 through L7.

The enable report back via the preceding circuits ($5_2$ and $5_1$), instead of a direct enable report by the last circuit ($5_3$) in the series connection to the memory 6, has the advantage that all circuits 5 may be of an identical construction. If this report back were done directly, there would be a difference between the use of circuits 5, as the last circuits in a series connection, that is to say comprising a gate 10, and for use as the preceding circuits in the series connection, without the presence of a gate 10. In addition, the enable report back via preceding circuits 5 ensures that all circuits have received the full information and that none of them is defective.

In FIG. 3, the information output 7, which carries the DAT-information of the store 6, is connected to a data input of a first input shift register 16 having 56 register stages. A data output of the register 16 is connected via a switching device 17 to a data input of a second input shift register 18 having 35 register stages. A data output of the register 18 carrying the DAT-information is connected to a data input of the signal correction circuit $5_2$, which comprises a first and a second input shift register in a similar way as the circuit $5_1$. Similarly the circuit $5_2$ is followed in the series connection by the circuit $5_3$.

A clock pulse input of the input shift register 16 is connected to the output of a change-over device 19, which has two inputs to which the clock pulse signal CS2, received from the store 6, and the signal S17, (FIG. 6) received from the time signal generator 11, respectively, are applied. The device 19 receives the signal S7 (FIG. 5) as a switching signal from the generator 11. In FIG. 3 it is shown by means of a 0 and a 1-position in the change-over device 19, which input is connected to the output when the logic 0 or 1 occurs in the switching signal S7. From the signal S7 of FIG. 5, it can be seen that the signal S17 of FIG. 6 is only active as a clock pulse signal at the input shift register 16 during the scanning line L10=HO. The signal S17 then operates as a shifting clock signal. Outside the duration of the scanning line L10=HO, the clock pulse signal CS2 can be applied to the register 16, this supply only having relevant results during the duration of the scanning lines L2 through L7 when, via the gate 10 and the signal S6, the memory 6 is enabled by means of the signal DIE1 to release the absolute correction information together with the relative differential information. The signal CS2 is then active as an input clock signal.

In similar manner, a clock pulse input of the input shift register 18 is connected to the output of a change-over device 20, which has two inputs to which the clock pulse signal CS2, as an input clock signal, and the signal S18, as a shifting clock signal, respectively, are applied. It should be noted that, as will be apparent from the description of the time signal generator 11 of FIG. 4, the generator 11 does not produce signals of the line frequency and a higher frequency during the occurrence of the pulse having the logic value 1 in the signal S1 of FIG. 5. Thus, the generator 11 is partly blocked during the scanning lines L1 through L9, which will be apparent from the signals S8 and S9 of FIG. 5.

The signal S5 of FIG. 5 is applied as a switching signal to the switching device 17, the data output of the first input shift register 16 and the DAT-information output 7 of the memory 6, respectively, being connected in the 1 and 0-position, respectively, to the data input of the second input shift register 18. It follows that the switching device 17 operates as a by-passing switching device as a result of which, when the relative difference information and the absolute correction information during the scanning lines L2 through L7 (signal S5 of FIG. 5) are sequentially supplied from the memory 6, the registers 16 and 18 are serially operative and when only relative difference information is applied before the periodic scanning lines H16 occur, the register 16 is by-passed.

In the first input shift register 16, the first eight input shift register stages nearest the data output have parallel outputs, which are connected to eight parallel inputs of a first buffer register 21 to which the signal S10 of FIG. 6 is applied as a shift signal. Likewise, the second input shift register 18 has five parallel outputs at the first five register stages nearest the data output of the register 18, these outputs being connected to five parallel inputs of a second buffer register 22, to which the signal S10 is applied as a shift signal. The signal S10, shown in FIG. 6 has a shift pulse p1 at the beginning of each column period C1, C2, etc. During the scanning line HO and the periodic scanning lines H16, the shift pulses p1 in the signal S10 effect a shift of the information through the buffer registers 21 and 22. During the scanning line HO a relevant shift of information is effected in the two buffer registers 21 and 22, while during the scanning lines H16 a relevant shift of information is only effected in the second buffer register 22.

The buffer register 21 is followed by a first change-over device 23. The eight parallel outputs of the buffer register 21 are connected to eight parallel inputs of a first group 24 of twelve parallel inputs of the first change-over device 23. Of the first group 24 of twelve parallel inputs, four inputs are connected to ground, which corresponds to the supply of a logic 0. The change-over device 23 has a second group 25 of twelve parallel inputs, the first group 24 or the second group 25 of parallel inputs being connectable to twelve parallel outputs under the control of the signal S7. From the signal S7 of FIG. 5 and the 0 and 1-positions shown in FIG. 3 of the change-over device 23, it follows that the first group 24 of parallel inputs is connected to the parallel outputs only for the duration of the scanning line L10=HO. In similar manner, the second buffer register 22 is followed by a second change-over device 26, which has a first group 27 and a second group 28 of five parallel inputs each and a group of five parallel outputs, while the signal S6 is applied thereto as a switching signal. From the signal S6 of FIG. 5 and the 0 and 1-positions shown in FIG. 3 of the change-over device 26, it can be seen that the first group 27 of parallel inputs is connected to the outputs for the duration of the scanning lines L1, L8, L9, L10=HO, and the periodic scanning lines H16. The time durations of the scanning lines L10=HO and H16 are the only relevant durations, as the buffer register 22 only receives shift pulses p1 in the signal S10 outside the occurrence of the scanning lines L1 through L9, within which the time signal generator 11 is partly blocked by the signal S1 of FIG. 5. For the duration of the scanning lines H1 through H15, the second group 28 of parallel inputs is connected in a relevant manner to the parallel outputs of the change-over device 26.

The cooperation between the first input shift register 16, the first buffer register 21 and the first change-over device 23, results in that seven shift pulses p1 of the signal S10 are active at the register 21 for the duration of the scanning line L10=HO, the information stored in the register stages 1...8 of the register 16 being present at eight MSB-parallel outputs of the device 21 (outputs having the most significant bits). The register 21 is blocked after each shift pulse p1 and eight clock pulses p4, 6, 8, 10, 12, 14, 16, 18 in the signal S17 effect a shift of information in the register 16. Simultaneously, the same signal processing is effected at the second input shift register 18, the second buffer register 22 and the second change-over device 26, five register stages 1... 5 being, however, operative and five clock pulses p10, 12, 14, 16, 18 in the signal S18 effecting the shifting operation.

It can be seen that for the duration of the scanning line L10=HO, the eight MSB-parallel outputs of the device 23, which carry the most significant bit information, carry code words from the occurrence of the pulses p1 in the signal S10, which code words determine the value of the absolute signal corrections in the columns C1, C2 etc. The eight MSB-parallel outputs of the device 23 are connected to eight parallel inputs of an output shift register 29 of the parallel-in, series-out type P/S. The signal S11 with the pulses p3 is applied to a parallel load input of the register 29, while the signal S17 of FIG. 6 is applied to a clock pulse input. The result is that during eight clock pulses p3, 5, 7, 9, 11, 13, 15, 17 of the signal S17, the output of the register 29 carries the series code word corresponding to the signal correction. The output of the register 29 is connected to data inputs of digital-to-analog converters 30 and 31, respectively (D/A). The converter 30 has a clock pulse input to which the signal S17 with clock pulses p4, 6, 8, 10, 12, 14, 16, 18 is applied. The signal S12 with pulses p20 and the signal S19, which varies as shown in FIG. 6, are applied to further inputs of the converter 30. From the pulse p20 in the signal S12 onwards the output of the converter 30, which is connected to the output terminal $12_1$, carries the signal correction information and then only when the logic 0 is present in the signal S19. FIG. 6 shows that the information released at the output terminal $12_{11}$ carries the signal correction information and then only when the logic 0 is present in the signal S19. FIG. 6 shows that the information released at the output terminal $12_{11}$, from the beginning of the pulse p20 in the column period C1 and intended for the absolute signal correction in the column period C2, has been derived from the register 16 during the pulse p1 in the column period C1. The same holds for the absolute signal correction in the columns C3 through C7. Then the signal S19 acts as a line blanking signal, as the converter 30 is blocked from the pulse p20 in the column time period C7 onwards until the pulse p20 in the column period C1. It should be noted that this line blanking period is shorter than the standardized blanking period, as will be apparent from a comparison between FIG. 1 and FIG. 2.

Also the signal S17 is applied as a clock pulse signal to the converter 31, while the signal S16, with only the pulse P20 in the column period C7, determines the signal at the converter output which is connected to the output terminal $12_{11}$. The input of the converter 31, corresponding to the input of the converter 30 to which the signal S19 is applied, is connected to ground so that a predetermined correction signal is present at the output terminal $12_{11}$ from the beginning of the pulse p20 in a column period C7 until the beginning of the pulse p20 in the following column period C7. As a result thereof the signal correction is active for the entire duration of a line period.

In addition to the fact that the output shift register 29 applies the output correction information for the duration of the scanning line L10=HO, this information is further processed in a full-adder circuit 32. To this end the twelve parallel outputs of the first change-over device 23 are connected to a first group 33 of twelve parallel inputs of the circuit 32, a second group 34 of parallel inputs of which is connected to the outputs of the second change-over device 26. In FIG. 3 it is indicated by means of 1+4 at the group 34 that four parallel outputs of the change-over device 26 carry bits which determine the magnitude of the difference correction and that one output with a logic 1 or 0 determines an adding or subtracting operation in the full-adder circuit 32. In the manner still to be described with reference to FIG. 7 the output carrying the adding subtracting bit is combined in the circuit 32 with the eight MSB-parallel outputs of the device 23.

The twelve parallel outputs of the adder circuit 32 are connected to twelve parallel inputs of a first memory shift register 35. Each parallel input of the register 35 is followed by seven register stages, the signal S12 being applied as shift signal with pulses p20 to a clock pulse input. The twelve parallel outputs of the register 35 are connected to the second group 25 of twelve parallel inputs of the change-over device 23. Five parallel inputs of a second memory shift register 36 are connected to the outputs of the change-over device 26, five parallel outputs thereof being connected to the second parallel input group 28 of the change-over device 26. Each input of the register 36 is followed by seven register stages, the signal S12 with the pulses p20 being applied as shift signal to the register 36.

For the duration of the scanning line L10=HO, from each pulse p1 in the signal S10 onwards, the associated absolute correction information is present at the eight MSB-inputs of the group 33 of twelve inputs of the adder circuit 32. Likewise, the relative difference information for the first row R1 of subregion RC is present at the group 34 of parallel inputs. The combined information (added and subtracted) is then present at the outputs of the circuit 32 and, consequently, at the inputs of the register 35. At the occurrence of the next first pulse p20 in the signal S12, the combined information is stored, and previously stored information is shifted. At the end of the duration of the scanning line L10=HO, the memory shift register 35 has been completely filled with the absolute correction information and with once the relative difference information of the row R1 of subregions RC. In the same manner the second memory shift register 36 stores the information, which becomes available from the pulses p1 onwards in the signal S10, at the occurrence of the pulses p20 in the signal S12. At the end of the duration of the scanning line L10=HO, the memory shift register 36 has been completely filled with the relative difference information associated with the row R1 of the subregions RC.

At the end of the duration of the scanning line L10=HO (at pulse p21' of signal S2), the first and the second change-over devices 23 and 26 are adjusted to the position shown in FIG. 3, the second groups 23 and 28, respectively, of parallel inputs being connected to the respective parallel outputs. During the next scanning line L11=H1, a shifting operation occurs in the memory shift registers 35 and 36 at the pulses p20 in the signal S12. Then the relative difference information present at the outputs of the register 36 is again received at the inputs of this register 36 and is also combined in the adder circuit 32 with the information present at the outputs of the device 23, said last information consisting of the absolute correction information and once the relative difference information. In the manner described, the information, which becomes available from the pulse p20 in the signal S12 onwards, is processed in the output shift register 29 from the pulses p3 in the signal S11 onwards. At the next pulses p20 the memory shift register 35 stores the combined information consisting of the absolute correction information and twice the relative difference information.

In the above-described manner, it follows that for the duration of the scanning line L25=H15, the output shift register 29 processes information consisting of the absolute correction information and fifteen times the relative difference information associated with the first row R1 of subregions RC, while information consisting of the absolute correction information and sixteen times the relative difference information is stored in the memory shift register 35. For the duration of the next scanning line L26=H6, this information is shifted and processed in the output shift register 29. The second change-over device 26 is then, however, in the 0-position (signal S6). Before the scanning line L26=H16 occurs, the input shift register 18 has been filled in the above-described manner with the difference information from the memory 6 for the second row R2 of subregions RC. For the duration of the scanning line L26=H16, the memory shift register 36 is filled and the new difference information is directly applied to the adder circuit 32 and combined with the information present at the first group 33 of inputs. This results in that information consisting of the absolute correction information, sixteen times the relative difference information associated with the row R1 of subregions RC, and once the relative difference information associated with the row R2 of subregions RC, is stored in the memory shift register 35. This information is processed in the output shift register 29 at the scanning line L27=H1 when the change-over switch 26 is in the position shown in the drawing.

In the above-described manner the following signal corrections in the columns C1 through C7 are obtained, it holding for each scanning line portion in a column, that it obtains a signal correction consisting of the absolute correction, sixteen times the relative difference correction of each one of the preceding, the superjacent rows R1, R2 etc. of subregions RC and the same number of times its own subregion correction as indicated by the line numbering H1, H2, etc. in the subregion RC.

The corrections at the row R19 of subregions R19C1 through R19C7 are effected in the interlaced 625-line system in the described field period up to and including the scanning line H12. Namely, in the row R19 there are 14.5 scanning lines H, 2.5 scanning lines H being blanked in the pre-equalizing period TVB1 of FIG. 1. During the occurrence of the blanked scanning line H15, the positive-going pulse edge at which the field flyback starts, occurs in the field pulse scynhronizing signal VS of FIG. 5. At the subsequent occurrence of the first positive-going pulse edge in the line pulse synchronizing signal HS of FIG. 5, the time signal generator 11 is triggered to generate the signals for the next line raster, in the manner as described for the scanning lines L1, 2, 3, . . . etc. in the preceding field period of FIG. 5.

For the interlaced 525-line system having 12.5 scanning lines in the last row R16 of subregions RC and three blanked scanning lines in the pre-equalizing period TVB1, there follows for the described field period an effective correction up to the center of the scanning line H10, the field flyback starting at 262.5 lines.

The signals shown in FIG. 5 and FIG. 6 may be generated in a time signal generator 11, a detailed construction of which is shown in FIG. 4. The vertical or field pulse synchronizing signal VS of FIG. 5 is applied to a preparatory input (D) of a flip-flop 40 of the D-type. The flip-flop 40 has a clock pulse input C to which the horizontal or line pulse synchronizing signal HS is applied and a set input S and a reset input R, which are both connected to ground. Reference Q denotes an output and Q an inverse output of the flip-flop 40. For D-flops, it holds that the flip-flop is enabled by means of the ground potential applied to the S and R-inputs, a positive-going clock pulse edge at the C-input resulting in that the Q-output starts carrying the same logic value as present on the D-input, if this value is not already present there. When the logic 1 is applied to the S or R-input, the Q-output carries the logic 1 and 0, respectively, and that in a dominant manner, independent of ascending clock pulse edges present at the C-input.

From the signals VS and HS shown in FIG. 5, it follows that the Q-output of the flip-flop 40 carries the signal S1 shown. Each one of the positive-going pulse edges having a trigger action in the signal HS, is indicated by means of an arrow tip and the associated logic values 1 and 0 are represented by a dot in the signal VS. The Q-output of the flip-flop 40, which carries the inverse signal S1, is connected to an input of a logic gate 41, which is in the form of an AND-gate, and to a further input of which the signal HS is applied via an inverter 42. The output of the gate 41 carries the signal HS of FIG. 6 when this gate is conductive, which is not the case for the duration of the scanning lines L1 through L9, when the logic 0 occurs in the signal S1. The output of the gate 41 is connected to the C-input of a D-flip-flop 43, the S-input of which is connected to ground and the Q-output to the D-input. The signal S2 is applied to the R-input of the flip-flop 43, the signal S8 being obtained in response to the applied signals HS and S2. The signal S2, which must still be further derived, is shown in FIG. 5 and FIG. 6 with a narrow pulse p21' which occurs at the line frequency (in the period of time C7 of FIG. 6). In the generator 11 the pulse p21' acts as an internal reset and count pulse of the line frequency. At the flip-flop 43, the application of the pulse p21' in the signal S2 to the R-input results in that the Q-output starts carrying the logic 1 which, when fedback to the D-input results in that a positive-going clock pulse edge at the C-input produces the logic 0 at the Q-output. From FIG. 6 it follows that the signal S8 carries a pulse p21, 22 of the line frequency, but according to FIG. 5 this is only so outside the occurrence of the scanning lines L1 through L9 when the gate 41 is blocked by the signal S1. In the generator 11 the signal S8 acts as an internal set-reset signal of the line frequency by its application to the S-input of a D-flip-flop 44 and to the R-input of a series-in, parallel-out shift register 45, respectively. The C-inputs of the flip-flop 44 and the register 45 are supplied with the clock pulse signal CS1. The R-input of the flip-flop 44 is connected to ground, the Q-output, which carries the signal S9, being connected to the data input of the register 45. The $22^{nd}$ parallel output of the register 45, having 22 register stages, this parallel output carrying the signal S14, is connected to the D-input of the flip-flop 44. The flip-flop 44 and the register 45 form a resettable clock pulse counting circuit (44, 45) which six times has a count number equal to 23 (via the signals S14 and S9), and, in response to the reset operation (via the signal S8) has a count number equal to 22. The register 45 is formed from, for example, six 4-bit static shift registers.

The first and the third parallel outputs of the register 45 are directly utilized for the supply of the signals S10 and S11 with the pulses p1 and p3, respectively. Parallel outputs 10, 12, 14, 16 and 18 of the register 45 are connected to inputs of a logic gate 46, which is in the form of an OR-gate, as a result of which the gate output carries the signal S18 with the pulses p10, 12, 14, 16, 18. The output of the gate 46 and parallel outputs 4, 6 and 8 of the register 45 are connected to inputs of an OR-gate 47 which, in response thereto, carries the signal S17 with the pulses p4, 6, etc. through p18. The output of the gate 47 is connected to the input of an inverter 48, which carries the signal S17, the pulses p3, 5 etc. through p17 of which are used as clock pulses.

The first parallel output of the register 45, which carries the signal S10 with the pulses p1, is connected to the C-input of a counting circuit 49, to an R-input of which the signal S8 is applied. The counting circuit 49 is, for example, in the form of a stage Johnson decade counter and has a second clock pulse input C at which descending pulse edges may exercise a trigger action but, however, the C-input of the counting circuit 49 is connected to ground in FIG. 4. The seventh parallel output of the counting circuit 49, which signal carries the S15 of FIG. 6, is connected to an input, respectively, of AND-gates 50 and 51. During the line period RH the counting circuit 49 operates with a count number equal to seven for the pulses p1 in the signal S10, these pulses being applied as clock pulses, the signal S8 with the pulse p21, 22 being operative as a reset signal.

A further input of the gate 50 is connected to the $21^{st}$ parallel output of the register 45, this output carrying the signal S13 of FIG. 6. When the signals S15 and S13 are applied to it, the AND-gate 50 produces the signal S2 with the pulse p21' which is shown in FIG. 6 and is of a short duration. Thus, the internal signal S2 of the line frequency is formed by logic circuits (49, 50), which are connected to the register 45.

A further input of the gate 51 is connected to the 20th parallel output of the register 45, which output carries the signal S12 of FIG. 6. When the signals S15 and S12 are applied to it, the AND-gate 51 produces the signal S16 with the single pulse p20, shown in FIG. 6, in the period of time C7 of the line period TH.

The signal S12 is further applied to a C-input of a D-flip-flop 52, the S and R-inputs of which are connected to ground and the D-input of which receives the signals S15. As a result thereof, the Q-output of the flip-flop 52 carries the signal S19 shown in FIG. 6, as, at the ascending edge of the pulse p20 in the signal S12, there are present for the first time in the signal S15 the logic 0 in the period of time C1 and the logic 1 in the period of time C7.

The signals S2, S8 etc. through S19, which were described with reference to FIG. 4, can be seen to have pulses of the line frequency and of a higher frequency only outside the duration of the scanning lines L1 through L9 when the described portion of the time signal generator 11 is blocked by the signal S1.

The Q-output of the flip-flop 40 in FIG. 4, on which the signal S1 of FIG. 5 is present, is connected to the R-input of a 4-bit binary counting circuit 53 which has four parallel outputs to which an OR-gate 54 is connected. The counting circuit 53 has a C-input to which the signal S2 is applied and a C-input which is connected to the positive voltage +U1, which represents the logic 1 value. The output of a resettable periodic binary line counting circuit (53, 54) thus formed carries the signal S3. After the reset operation produced by the flip-flop 40, the line counting circuit (53, 54) has, for the duration of the scanning lines L1 through L9, a count number equal to sixteen, which count number corresponds to the number of scanning lines H of each subregion RC of FIG. 1 (except row R19) and FIG. 2.

The time signal generator 11 of FIG. 4 further comprises a counting circuit 55 in, for example, the form of a 5-stage Johnson decade counter, the C-input of which receives the line pulse synchronizing signal HS and the R-input receives the inverted field pulse synchronizing signal VS via an inverter 56. The ninth parallel output of the resettable, decade line pulse counting circuit 55 is connected to the C-input, which ensures that the counting circuit 55 is blocked internally in the event that the pulse in the signal VS has a duration which is longer than nine line periods TH. The first parallel output of the counting circuit 55 carries the signal VS1, shown in FIG. 5, and applies this signal to the C-input of a D-flip-flop 58 via an inverter 57. The eighth parallel output of the counting circuit 55, which carries the signal S4, is connected to the R-input of the flip-flop 58. The S-input of the flip-flop 58 is connected to ground and the D-input is connected to the positive voltage +U1, which represents the logic 1 value. The Q-output of the flip-flop 58 carries the signal S5, shown in FIG. 5, the descending pulse edge in the signal VS1 resulting in the logic 1 in the signal S5 and the logic 1 in the signal S4 resetting the flip-flop 58, the logic 0 being present at the Q-output.

The Q-output of the flip-flop 58, which carries the signal S5, is connected to the input of an OR-gate 59, to a further input of which the signal S3 is applied. The output of the gate 59 consequently carries the signal S6, which becomes further available as the inverted signal S6 via an inverter 60. The signal S6 is combined in the manner described with reference to FIG. 3 with the enable signal DIE2 by means of the AND-gate 10, to form the enable signal DIE1.

The Q-output of the flip-flop 40, carrying a signal S1, is connected to the C-input of a D-flip-flop 61. The S-input of the flip-flop 61 is connected to ground, the D-input is connected to the positive voltage +U1, which represents the logic 1, and the R-input receives the signal S2. The ascending pulse edge in the signal S1, which corresponds with the descending pulse edge in the signal S1 of FIG. 5, causes the Q-output of the flip-flop 61 to carry the logic 1, whereafter the first pulse p21' in the signal S2 with the logic 1 provides a reset to the logic 0, which results in the signal S7 shown in FIG. 5.

FIG. 7 shows in detail a portion of the block schematic circuit diagram of FIG. 3, the components shown in FIG. 3 having been given the same or adapted reference numerals. In FIG. 7, the input shift register 16 of FIG. 3 is formed from two registers 16a and 16b. The eight parallel outputs of the register 16a are connected to the buffer register 21, while the data series output is connected to the by-passing circuit device 17, which comprises two AND-gates 70 and 71 and an OR-gate 72, which is connected to the gate outputs. The data series output of the register 16a is connected to an input of the gate 70, while the gate 71 receives the DAT-information. The signal S5 of FIG. 5 is applied as a gate signal to the gate 70, while the gate 71 receives the inverted signal S5. The output of the gate 72 is connected to the data input of a register 18b, which forms in combination with a register 18a having five parallel outputs, the second input register 18, the register 18a being connected to the buffer register 22. Each register 16a and 18a may be assembled from two 4-bit static shift registers, the register 16b from three and the register 18b from two 18-stage static shift registers. A hold circuit, such as, for example, what is commonly referred to as a "D-latch", may be used for each stage of the buffer registers 21 and 22.

In contrast with the construction shown for FIG. 3, the change-over devices 19 and 20 are both supplied with the signal S6 as a switching signal. For the device 19, this is permissible as the time signal generator 11 is partly blocked for the duration of the scanning lines L1 through L9 and does not generate pulses for the signal S17. The input clock pulse signal CS2 is applied to an input of an AND-gate 73, to a further input of which the signal S6 is applied. The signal S6 is also applied to inputs of two AND-gates 75 and 76 via an inverter 74. A further input of the gates 75 and 76, respectively, receives the signal S17 and S18, respectively. The outputs of the gates 75 and 76, respectively, are connected to respective inputs of OR-gates 77 and 78, respectively, further respective inputs of which are connected to the output of the gate 73. For the duration of the scanning lines H0 and H16, the signal S6 has the logic 0 value, so that the signals S17 and S18 are used as shift clock signals, while, at a preceding logic 1, the signal CS2 can exercise its function as input clock signal.

For each input of the groups 24 and 25 of parallel inputs, the change-over device 23 has always two AND-gates 79 and 80, and an OR-gate 81 connected to the outputs of these AND-gates. In response to the signal S7 applied to the AND-gates 79 and the signal S7 applied to the AND-gates 80, the gates 79 are only conductive for the duration of the scanning line L10=H0. The eight outputs of the register 21 and four terminals 82, which are connected to ground, of the group 24 of twelve parallel inputs, are connected via the gates 79 to the outputs of the twelve gates 81. The eight outputs of the gates 81, which carry the most significant bits (MSB), are connected to the output shift register 29. The register 29 is in the form of, for example an 8-bit static shift register and each converter 30 and 31 may be in the form of an 8-bit shift-and-store bus register. The total of twelve outputs of the gates 81 are connected to inputs A (group 33) of the full-adder circuit 32, which further comprises inputs B for connection to the group 34 of parallel inputs, and also twelve outputs S, which are connected to twelve 7-stage shift registers forming the memory shift register 35. The full-adder circuit 32 is in the form of, for example, three 4-bit binary full-adders.

Likewise, the change-over device 26 is of a construction having, for each input of the groups 27 and 28 of five parallel inputs, two AND-gates 83 and 84 and an OR-gate 85. The signals S6 and S6, respectively, are applied as gate signals to respective inputs of the gates 83 and 84, respectively. In conjunction with the signal S10, which is applied to the buffer register 22, the information from the register 22 is supplied from the outputs of the five gates 85 via the group 27 of inputs and the gates 83, for the duration of the scanning line L10=H0 and the periodic scanning lines H16. The outputs of the five gates 85 are connected, on the one hand, to the inputs of five 7-stage shift registers forming the memory shift register 36 and, on the other hand, to the group 34 of parallel inputs of the adder circuit 32. Four inputs of the group 34 of parallel inputs, these four inputs carrying the bit-information for the magnitude of the difference correction, are connected to four separate inputs B of the circuit 32, while the fifth input is connected to the eight remaining inputs B of the circuit 32. A logic 0 on the eight interconnected inputs B results in an addition of the difference correction and a logic 1 results in a subtraction.

The signal S7, applied as a gate signal to the gates 80, releases these gates outside the duration of the scanning line L10=H0. For the duration of the periodic scanning lines H1 through H15, the gates 84 are released by the signal S6 to repeatedly shift the difference information from the five registers forming the memory shift register 36. The five and twelve register, respectively, forming the memory register 36 and 35, respectively, may be in the form of 8-bit static shift registers.

As regards the addition or subtraction in the full-adder circuit 32, it should be noted that at the code word 0 1111, the maximum difference correction is added and that at the code word 1 0001, the maximum difference correction is subtracted. Starting from a predetermined absolute correction for the scanning line L10=H0, it always holding that the four least significant bits (LSB) are equal to logic 0, it follows for the maximum difference correction that the total correction for the scanning line L11=H1 has not changed, while for each subsequent scanning line H2, H3 through H16 the total correction becomes one bit greater or less. The sum of the maximum difference correction for all sixteen scanning lines H of the subregion is then equal to fifteen bit values, which must be compared with the $2^8=256$ bit values for the absolute correction.

For adding and subtracting, respectively, a central value of the difference correction, it is possible to use, for example, the code word 0 1000 and 1 1000, respectively. The total correction for the scanning line L11=H1 is then not changed, whereafter the total correction for the scanning lines H2 and H3 has been changed by one bit value, etc., so that at all times two scanning lines have the same correction.

The code words 0 0001 and 1 1111, respectively, furnishes the minimum difference correction for the addition and subtraction, respectively, the total correction changing by only one bit value for all sixteen scanning lines of the subregion.

It can be seen that at the twelve-bit addition, wherein the eight most significant bits MSB are used for the correction and the difference correction is inserted into the four least significant bits LSB, a threshold has been introduced, as a result of which the total correction over a subregion having the sixteen scanning lines H can be changed by one to fifteen bit values, which, in conjunction with the 256 bit values of the code word for the absolute correction, is very satisfactory in practice. The threshold action causes the occurrence of correction differences between consecutive scanning lines H. Over a subregion RC of sixteen scanning lines H from one to fifteen correction steps may occur, having a magnitude of one bit value.

Alternative choices for the number of bits per code word, namely eight and four plus one, are possible. These choices may depend on the type of correction to be performed, for example the line and field scan and the dynamic focusing on both recording and display, and the dynamic convergence on display. For an ample correction possibility it is a requirement that for the magnitude of the absolute correction, the code word has a sufficiently larger number of bits than the code word for the magnitude of the relative difference correction, which requirement is well satisfied by choosing eight and four bits.

From the implementation of the time signal generator described with reference to FIG. 4 and the implementation of a further portion of the television circuit of FIG. 3, described with reference to FIG. 7, in which logic circuits such as gates, flip-flops registers etc. are present, it will be apparent that an implementation as an integrated circuit is very well possible.

What is claimed is:

1. A television circuit for use on signal recording and display, respectively, the circuit comprising a signal correction circuit for obtaining an optimum picture on display, corrections being made in subregions arranged in columns and rows, of a picture which corresponds with a scene to be recorded and displayed, this picture being converted, on signal recording as a potential image, into a picture signal by means of a line-by-line and field-by-field scan and being formed on signal display by means of the picture signal by means of a line-by-line and field-by-field scan, respectively, the television circuit including a memory whose memory locations containing correction information correspond to the subregions which each have their scanning lines, the memory being connected to the signal correction circuit by means of a correction-information carrying output, characterized in that in addition to the memory locations containing the signal correction information for the subregions of the picture, the memory comprises further memory locations, namely a first further memory location for each column of subregions, each first further memory location containing absolute correction information for all subregions in the column and relative difference information being present in each said memory location corresponding with a subregion in the column, each relative difference information providing, for each subregion, a correction information for each scanning line in the subregion, which is valid with respect to the preceding scanning line.

2. A television circuit as claimed in claim 1, characterized in that the information present in said first further memory locations of the memory, includes a code word having a number of bits which is larger than the number of bits of the code words in the memory locations corresponding with the subregions.

3. A television circuit as claimed in claim 2, characterized in that the code word in the said first further memory locations has eight bits and the code words in the memory locations corresponding with the subregions have five bits, one bit being used for addition and subtraction and four bits for the correction value.

4. A television circuit as claimed in any of the preceding claims, characterized in that subregions in a column comprises a number of scanning lines in the order of magnitude of sixteen.

5. A television circuit as claimed in claim 1, the correction circuit being provided with shift registers which are connectable to the information output of the memory for periodically storing the correction information, characterized in that for storing the absolute information and the relative difference information, a first and a second input shift register, respectively, are provided, each having a number of parallel outputs which correspond to the number of bits with which the correction information is provided by the memory, the parallel outputs of the first and second input shift registers, respectively, being coupled to inputs of respective first groups of inputs of a first and second change-over device, respectively, the changeover devices having respective second groups of inputs and respective groups of outputs, the groups of outputs of the first and second change-over devices being connected, respectively, to a first and a second group of inputs of an adder circuit having a group of outputs, the groups of outputs of the adder circuit and of the second change-over device, respectively, being connected to second groups of inputs of the first and second change-over devices, respectively, via a first and a second memory shift register, respectively, while the group of outputs of the first change-over device are further coupled to an output of the correction circuit.

6. A television circuit as claimed in claim 5, characterized in that a portion of outputs of the group of outputs of the first change-over device having the most significant bits (MSB) are connected to the said output of the correction circuit via a parallel-in, series-out output shift register and a digital-to-analog converter.

7. A television circuit as claimed in claim 5 or claim 6, characterized in that of the first group (23) of inputs of the first change-over device, (23) a number of inputs having the least significant bits are connected to a terminal which carries a voltage corresponding to the logic zero, a number of corresponding outputs of the first change-over device being connected to a number of inputs of the adder circuit, which has associated adder inputs which are coupled to outputs of the second memory shift register via the second change-over device.

8. A television circuit as claimed in claim 5, characterized in that the parallel outputs of the first and second input shift register, respectively, are coupled to inputs of the first groups of inputs of the first and second change-over devices, respectively, via a first and a second buffer register, respectively.

9. A television circuit as claimed in claim 5, characterized in that the first input shift register is connected to the second input shift register via a by-passing switching device during each field period, the by-pass not being present during the sequential supply of relative difference information and absolute information and being present during the periodic supply of only relative difference information.

10. A television circuit as claimed in claim 1, the circuit comprising a time signal generator having inputs for receiving a clock pulse signal and a line and field pulse synchronizing signal and having outputs for supplying periodically occurring time signals, characterized in that the time signal generator comprises a resettable clock pulse counting circuit having a series-in, parallel-out shift register which has a clock pulse signal input (C), a reset input (R) and a data input, the data input being coupled to a register output via a first flip-flop and the reset input (R), which is connected to a set input (S) of said first flip-flop, being connected to an output (Q) of a second flip-flop for supplying a set-reset signal of line frequency when the line pulse synchronizing signal is applied to a clock input (C) and an internal signal of line frequency is applied to a reset input (R) of the second flip-flop, which internal signal of the line frequency is produced by logic circuits from output signals of the series-in, parallel-out shift register.

11. A television circuit as claimed in claim 10, characterized in that the time signal generator further comprises a resettable, periodic, binary line counting circuit having a clock input (C) for receiving said internal line signal of the line frequency and having a reset input (R) which is connected to an output (Q) of a third flip-flop having a preparatory input (D) for receiving the field pulse synchronizing signal and a clock input (C) for receiving the line pulse synchronizing signal, the flip-flop output (Q) having for its function to supply a reset signal which has a duration of several line periods and which exceeds the field synchronizing pulse.

12. A television circuit as claimed in claim 11, characterized in that the time signal generator further comprises a logic gate an input of which is connected to an output (Q) of said third flip-flop for supplying, with a blocking polarity, a signal which corresponds to said signal of the duration of several line periods, the gate output of the logic gate being connected to the clock input (C) of said second flip-flop, this gate having a further input for receiving the line pulse synchronizing signal.

13. A television circuit as claimed in claim 10, 11 or 12, characterized in that the time signal generator further comprises a resettable, decade, line pulse counting circuit which has a clock input (C) for receiving the line pulse synchronizing signal, a reset input (R) for receiving the field pulse synchronizing signal with an enabling polarity for the field synchronizing pulse of the duration of several line periods, and a plurality of outputs, a first output being connected to a clock input (C) of a fourth flip-flop, via an inverter and a further output being connected to a reset input (R) of flip-flop.

14. A television circuit as claimed in claim 13, characterized in that the circuit comprises several signal correction circuits which are arranged in series and connected to the information output of the memory, the last signal correction circuit in the series circuit applying an enabling signal to an enable connection line to the memory after full reception of the correction information.

15. A television circuit as claimed in claim 14, characterized in that in each of the signal correction circuits the outputs of said binary line pulse counting circuit and an output of said fourth flip-flop are connected via an OR-gate to an input of an AND-gate which has a further input and an output, which are connected to an incoming and outgoing enable connecton line, respectively.

16. A television circuit as claimed in claim 1, characterized in that the circuit comprises several signal correction circuits which are arranged in series and connected to the information output of the memory, the last signal correction circuit in the series circuit applying an enabling signal to an enable connection line to the memory after full reception of the correction information.

* * * * *